(12) United States Patent
Villalobos

(10) Patent No.: US 8,112,866 B2
(45) Date of Patent: Feb. 14, 2012

(54) METHOD FOR RESISTING PIVOTING MOVEMENT BETWEEN AN OUTER MEMBER AND AN INNER MEMBER OF A UNIVERSAL JOINT

(75) Inventor: Federico Villalobos, Chihuahua (MX)

(73) Assignee: Nexteer (Beijing) Technology Co., Ltd.

( * ) Notice: Subject to any disclaimer, the term of this patent is extended or adjusted under 35 U.S.C. 154(b) by 630 days.

(21) Appl. No.: 12/258,039

(22) Filed: Oct. 24, 2008

(65) Prior Publication Data

US 2009/0048029 A1 Feb. 19, 2009

Related U.S. Application Data

(62) Division of application No. 11/330,762, filed on Jan. 12, 2006, now Pat. No. 7,468,000.

(51) Int. Cl.
*P23P 11/00* (2006.01)
*F16D 3/84* (2006.01)
(52) U.S. Cl. .......... 29/436; 29/434; 29/898.04; 464/175
(58) Field of Classification Search .................. 29/428, 29/434, 436, 898, 898.04, 898.07, 898.11; 464/175, 906; 277/636
See application file for complete search history.

(56) References Cited

U.S. PATENT DOCUMENTS

| 4,196,598 | A |   | 4/1980  | Hirai et al. |
| 4,278,262 | A |   | 7/1981  | Mizutani et al. |
| 4,559,025 | A |   | 12/1985 | Dore |
| 4,820,238 | A |   | 4/1989  | Uchida et al. |
| 5,201,107 | A | * | 4/1993  | Mazziotti ......................... 29/434 |
| 5,451,186 | A |   | 9/1995  | Poulin et al. |
| 5,599,029 | A |   | 2/1997  | Umeno |
| 5,645,286 | A |   | 7/1997  | Katoh |
| 5,725,432 | A |   | 3/1998  | Konegen et al. |
| 5,765,837 | A |   | 6/1998  | Schwarzler |
| 5,879,238 | A |   | 3/1999  | Breheret |
| 6,139,027 | A |   | 10/2000 | Biekx |
| 6,179,717 | B1 |  | 1/2001  | Schwarzler |
| 6,209,885 | B1 |  | 4/2001  | Mukaida et al. |
| 6,406,375 | B1 |  | 6/2002  | Herchenbach et al. |
| 6,478,309 | B1 |  | 11/2002 | Miyamoto et al. |
| 6,938,902 | B2 |  | 9/2005  | Devers |
| 7,070,508 | B2 | * | 7/2006 | Eryilmaz et al. .............. 464/145 |
| 2003/0171154 | A1 | | 9/2003 | Farrace et al. |
| 2004/0017046 | A1 | | 1/2004 | Frazer |

FOREIGN PATENT DOCUMENTS

DE 103 23 071 12/2004

* cited by examiner

*Primary Examiner* — Sarang Afzali
(74) *Attorney, Agent, or Firm* — Cantor Colburn LLP

(57) ABSTRACT

A method for resisting pivoting movement between an outer member and an inner member of a universal joint includes engaging the outer member with the inner member in a chamber for pivoting movement through a first range of movement with a plurality of balls disposed in a plurality of inwardly facing grooves of the outer member and a plurality of outwardly facing grooves of the inner member to transmit rotation between the outer member and the inner member. The method includes enclosing the chamber portion with a boot having a plurality of convolutions defined by roots extending radially inward and resisting pivoting movement of the inner member relative to the outer member with an inner surface of a root contacting a shaft portion of the inner member upon the inner member and the outer member pivoting beyond the first range of movement.

10 Claims, 2 Drawing Sheets

METHOD FOR RESISTING PIVOTING MOVEMENT BETWEEN AN OUTER MEMBER AND AN INNER MEMBER OF A UNIVERSAL JOINT

CROSS REFERENCE TO RELATED APPLICATION

This application is a divisional patent application of U.S. patent application Ser. No. 11/330,762 filed on Jan. 12, 2006, now U.S. Pat. No. 7,468,000.

FIELD OF THE INVENTION

The invention relates to universal joints and more particularly to a boot for at least partially enclosing a universal joint.

BACKGROUND OF THE INVENTION

A universal joint facilitates the transmission of rotational movement between a driving shaft and a driven shaft. The universal joint is especially useful in applications wherein the driving and driven shafts are angled with respect to one another or can become angled with respect to one another during operation. The universal joint includes an inner joint member attached to one of the shafts and an outer joint member attached to the other shaft. The inner and outer joint members define grooves which cooperate to form passages. Roller balls are positioned in the passages and torque is transmitted between the shafts with the roller balls. A flexible boot is often employed to enclose the grooves and the balls to prevent debris from comprising the operation of the joint.

SUMMARY OF THE INVENTION

The invention provides a boot for a universal joint. The boot includes a first sleeve portion defining a first circular opening. The boot also includes a second sleeve portion spaced from the first sleeve portion along a boot axis. The second sleeve portion defines a second circular opening having a smaller diameter than the first circular opening. The boot also includes a plurality of convolutions defined along the boot axis between the first sleeve portion and the second sleeve portion by a plurality of roots extending radially inward toward the boot axis and by a plurality of crests extending radially outward away from the boot axis. The plurality of roots includes a first root and a second root immediately adjacent to one another. The first root is closer to the first sleeve portion than the second root. The first root extends radially toward the boot axis further than the second root.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
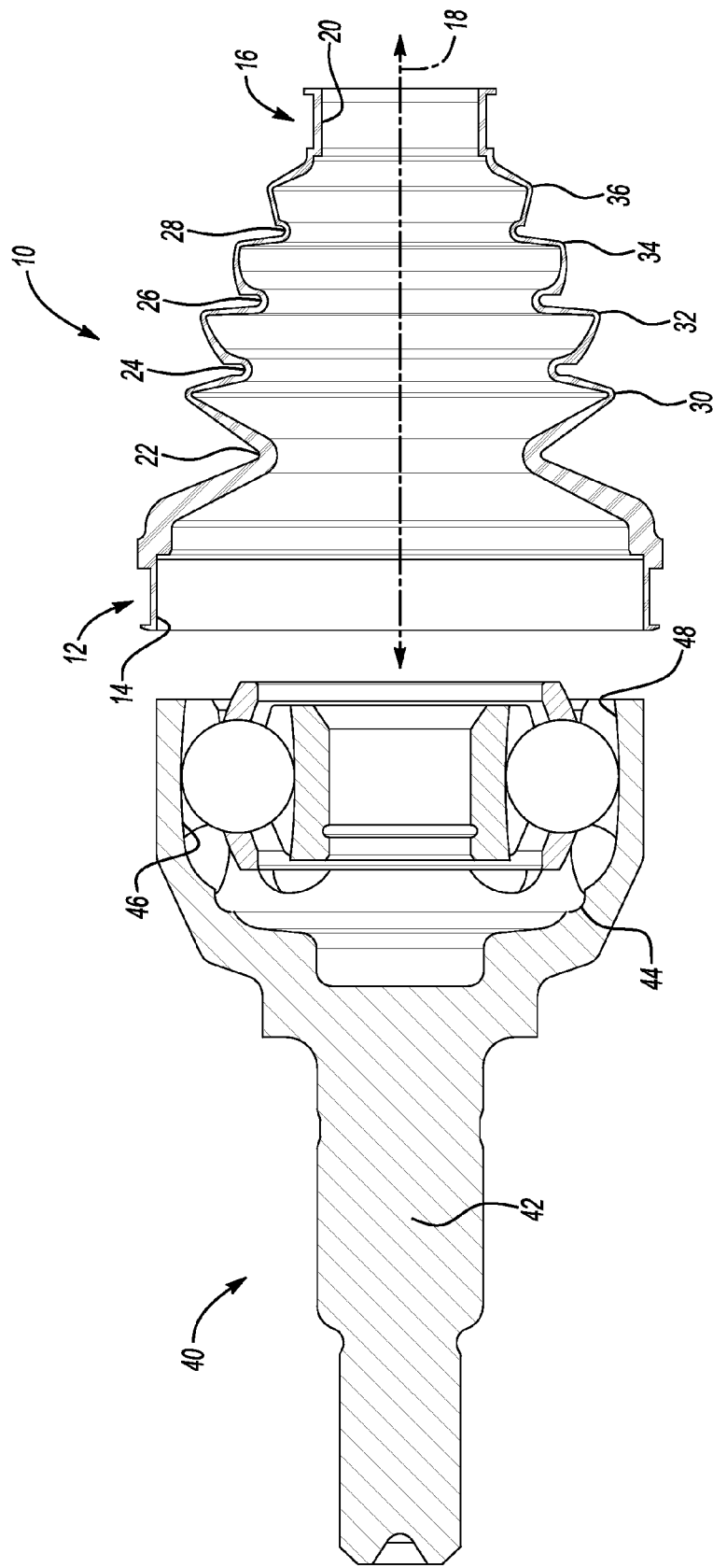
FIG. 1 is a front cross-sectional view of a boot according to the exemplary embodiment of the invention.
Figure 2:
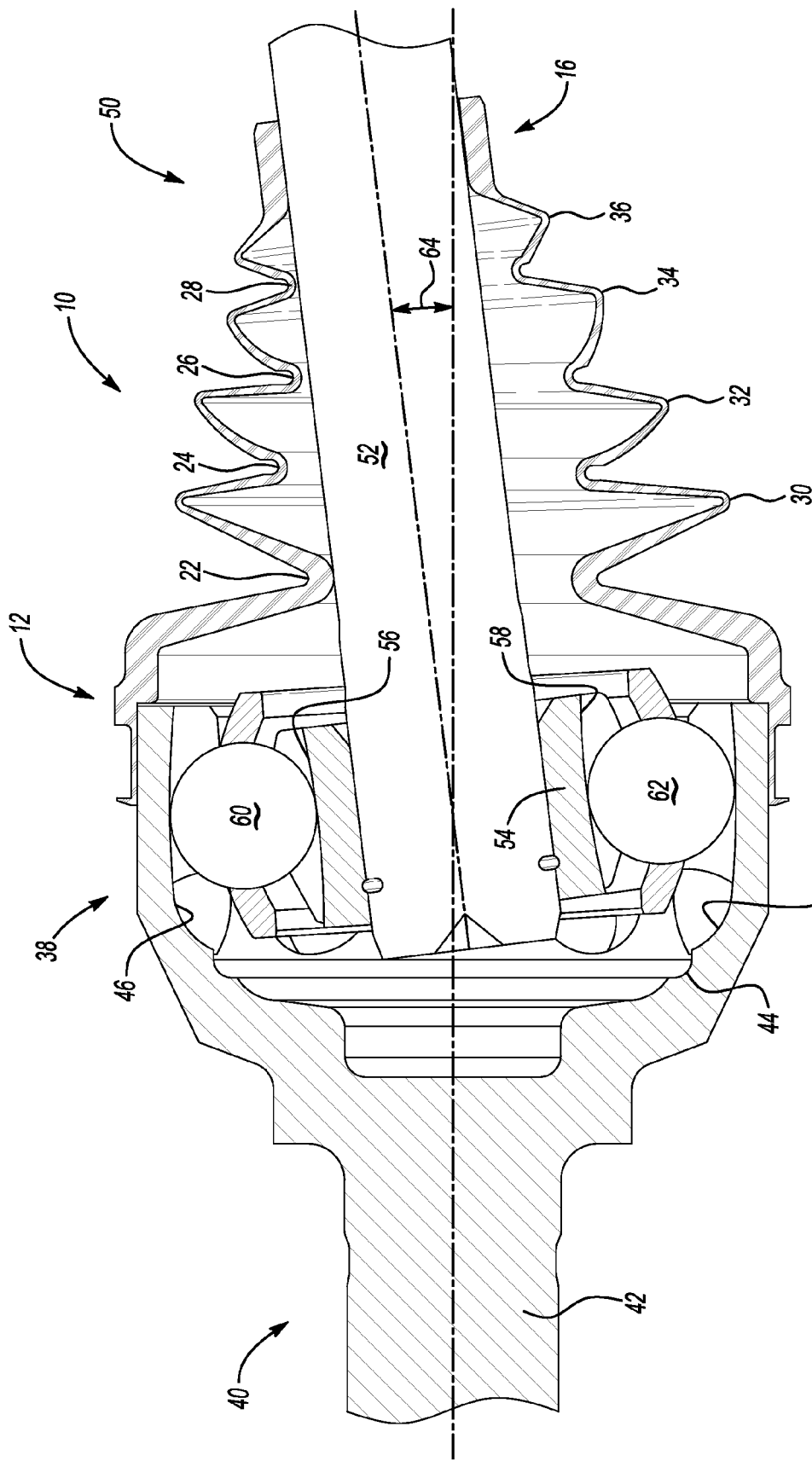
FIG. 2 is a front cross-sectional view of a universal device including the boot shown in FIG. 1.

With reference to the drawings, a universal joint 38 includes an outer joint member 40 having first shaft portion 42 and a chamber portion 44. A plurality of inwardly facing grooves 46, 48 are defined in the chamber portion 44. The universal joint 38 also includes an inner joint member 50 having a second shaft portion 52 and a groove portion 54. A plurality of outwardly facing grooves 56, 58 are defined on an radially outer surface of the groove portion 54. The groove portion 54 is disposed in the chamber portion 44. A plurality of balls 60, 62 are individually disposed in the plurality of inwardly facing grooves 46, 48 and in the plurality of outwardly facing grooves 56, 58. The balls 60, 62 transmit rotation between the outer joint member 40 and the inner joint member 50. Only two balls 60, 62 are shown in the drawings; however, most universal joints include six or eight balls.

The inner joint member 50 and the outer joint member 40 are pivotable relative to one another during operation of the universal joint 38. The exemplary universal joint 38 is an Auktor style joint. The inner joint member 50 and the outer joint member 40 are pivtoable relative to one another over a first range 64 of movement corresponding to normal operation. The inner joint member 50 and the outer joint member 40 can become disengaged from one another in response pivoting movement beyond the first range 64. In other words, the inner joint member 50 and the outer joint member 40 can become disassembled with respect to one another due to over-angulation.

A boot 10 for the universal joint 38 can prevent debris from entering the chamber portion 44. The boot 10 includes a first sleeve portion 12 defining a first circular opening 14. The first sleeve portion 12 encircles the chamber portion 44. A clamp (not shown) can be used to substantially fix the first sleeve portion 12 to a radially outward facing surface of the chamber portion 44. The boot 10 also includes a second sleeve portion 16 spaced from the first sleeve portion 12 along a boot axis 18. The second sleeve portion 16 defines a second circular opening 20 having a smaller diameter than the first circular opening 14. The second sleeve portion 16 encircles the second shaft portion 52 at a position spaced from the groove portion 54.

The boot 10 also includes a plurality of convolutions defined along the boot axis 18 between the first sleeve portion 12 and the second sleeve portion 16. Each convolution is defined by a plurality of roots 22, 24, 26, 28 extending radially inward toward the boot axis 18 and by a plurality of crests 30, 32, 34, 36 extending radially outward away from the boot axis 18. The boot 10 can have any number of convolutions. In the exemplary embodiment of the invention, the first sleeve portion 12 the second sleeve portion 16, and the plurality of convolutes are integrally formed with respect one another.

The plurality of roots 22, 24, 26, 28 includes a first root 22 and a second root 24 immediately adjacent to one another. The first root 22 is closer to the first sleeve portion 12 than the second root 24. The first root 22 extends radially toward the boot axis 18 further than the second root 24. The first root 22 resists pivoting movement of the inner joint member 50 relative to the outer joint member 40. This can be advantageous during assembly and transport of the universal joint 38. For example, the first root 22 can reduce the likelihood that the inner joint member 50 and the outer joint member 40 will become disassembled with respect to one another to over-angulation during assembly of the universal joint 38 to an operating environment such as a vehicle and/or during packaging, transport, and removal from packaging. In operation, the exemplary first root 22 will not prevent the inner joint member 50 and the outer joint member 40 from pivoting with respect to one another over the first range 64.

In the exemplary embodiment of the invention, the first root 22 is immediately adjacent to the first sleeve portion 12.

In other words, the first root 22 is closest to the first sleeve portion 12 of the plurality of roots 22, 24, 26, 28. However, in alternative embodiments of the invention, the first root 22, the root that limits pivoting movement, can be spaced from the first sleeve portion 12 by one or more convolutes, roots or crests. Also, in the exemplary embodiment of the invention, the first root 22 is thicker than the second root 24. The exemplary first root 22 is thicker than all of other of the plurality of roots 22, 24, 26, 28. However, in alternative embodiments of the invention, the first root 22, the root that limits pivoting movement, can be thinner than one or more of the other roots.

In the exemplary embodiment of the invention, the first root 22 extends radially further toward the boot axis 18 any of the other roots, including the third root 26 and the fourth root 28. This arrangement can be desirable to reduce the likelihood that the second shaft portion 52 will abrasively contact the roots 24, 26, 28. However, in alternative embodiments of the invention, roots other than the first root 22, the root that limits pivoting movement, could extend the same distance toward the boot axis 18. In other words, the first root 22 could have the same diameter as another root.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for resisting pivoting movement between an outer member and an inner member of a universal joint, said method comprising the steps of:
   engaging an outer joint member having a first shaft portion and a chamber portion with a plurality of inwardly facing grooves with an inner joint member having a second shaft portion and a groove portion with a plurality of outwardly facing grooves disposed in the chamber portion for pivoting movement relative to one another through a first range of movement;
   disposing a plurality of balls individually in the plurality of inwardly facing grooves and in the plurality of outwardly facing grooves to transmit rotation between the outer joint member and the inner joint member;
   enclosing the chamber portion with a boot having a first sleeve portion encircling the chamber portion with a first circular opening and also having a second sleeve portion encircling the second shaft portion with a second circular opening at a position spaced from the groove portion and spaced from the first sleeve portion along a boot axis and also having a plurality of convolutions defined along the boot axis between the first sleeve portion and the second sleeve portion by a plurality of roots extending radially inward toward the boot axis and by a plurality of crests extending radially outward away from the boot axis; and
   resisting pivoting movement of the inner joint member relative to the outer joint member with a radially inward facing inner surface of a first root of the plurality of roots contacting the second shaft portion upon the inner joint member and the outer joint member pivoting beyond the first range of movement.

2. The method of claim 1 further comprising the step of: thickening the first root relative to the other roots.

3. The method of claim 1 further comprising the step of: disposing the first root immediately adjacent to the chamber relative to the other roots.

4. The method of claim 1 further comprising the step of: extending the first root radially inward toward the boot axis further than at least two of the other roots.

5. The method of claim 1, wherein the pivoting movement of the inner joint member relative to the outer joint member is resisted with only the first root beyond a range of movement corresponding to normal operation.

6. The method of claim 1, further comprising permitting, without resistance, the inner joint member and the outer joint member to pivot with respect to one another over the first range of movement.

7. The method of claim 1, further comprising spacing the first root from the first sleeve portion by one or more convolutes.

8. The method of claim 1, further comprising thinning the first root, more than one or more of the other roots.

9. The method of claim 1, further comprising fixing the first sleeve portion to a radially outward facing surface of the chamber portion.

10. The method of claim 1, further comprising extending the first root radially inward toward the boot axis the same distance as the other roots.

\* \* \* \* \*